US006681339B2

(12) United States Patent
McKean et al.

(10) Patent No.: US 6,681,339 B2
(45) Date of Patent: Jan. 20, 2004

(54) SYSTEM AND METHOD FOR EFFICIENT FAILOVER/FAILBACK TECHNIQUES FOR FAULT-TOLERANT DATA STORAGE SYSTEM

(75) Inventors: Brian D. McKean, Longmont, CO (US); Noel S. Otterness, Boulder, CO (US); Joseph G. Skazinski, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 09/764,612

(22) Filed: Jan. 16, 2001

(65) Prior Publication Data

US 2002/0133735 A1 Sep. 19, 2002

(51) Int. Cl.[7] .............................. G06F 11/00
(52) U.S. Cl. .............................. 714/5; 714/6
(58) Field of Search .................. 714/5, 6, 9, 11

(56) References Cited

U.S. PATENT DOCUMENTS

| | | | | |
|---|---|---|---|---|
| 5,712,970 A | * | 1/1998 | Arnott et al. .................. | 714/6 |
| 5,724,501 A | * | 3/1998 | Dewey et al. .................. | 714/9 |
| 5,761,705 A | * | 6/1998 | DeKoning et al. ........... | 711/113 |
| 5,895,485 A | * | 4/1999 | Loechel et al. .............. | 711/119 |
| 5,896,492 A | * | 4/1999 | Chong, Jr. ..................... | 714/3 |
| 6,199,105 B1 | * | 3/2001 | Soejima et al. ............. | 709/213 |
| 6,247,099 B1 | * | 6/2001 | Skazinski et al. ........... | 711/141 |
| 6,279,078 B1 | * | 8/2001 | Sicola et al. ................ | 711/119 |
| 6,490,659 B1 | * | 12/2002 | McKean et al. ............ | 711/141 |
| 6,578,158 B1 | * | 6/2003 | Deitz et al. .................... | 714/11 |

* cited by examiner

Primary Examiner—Robert Beausoliel
Assistant Examiner—Yolanda L. Wilson
(74) Attorney, Agent, or Firm—R. Michael Ananian; Arthur J. Samodovitz

(57) ABSTRACT

Structure and method for efficient failover and failback techniques in a data storage system utilizing a dual-active controller configuration for minimizing a delay in responding to I/O requests from a host system following a controller failure is described. A stripe lock data structure is defined to maintain reservation status or stripe locks of cache lines within data extents that are part of a logical unit or storage volume. When a controller fails, dirty cache line data of a failed controller is taken over by a survivor controller. The stripe lock data structure is used to process I/O requests from a host system, by the failed controller. The data storage system functions in a single-active configuration until the dirty cache line data is flushed to one or more storage volumes, by the survivor controller. The inventive structure and method provide utilize a storage volume reservation system. The stripe lock data structure is defined in memory within each of the two or more caching controllers. The stripe lock data structure is used to provide consistent information within each of the two or more caching controllers, and the stripe lock data structure is used by a failed controller to process I/O requests from a host system until dirty cache line data is flushed to one or more storage volumes by a survivor controller. Provides a method and structure which minimizes a delay required to begin processing of host I/O request following a controller failure.

15 Claims, 7 Drawing Sheets

SYSTEM AND METHOD FOR EFFICIENT FAILOVER/FAILBACK TECHNIQUES FOR FAULT-TOLERANT DATA STORAGE SYSTEM

FIELD OF THE INVENTION

The present invention generally relates to efficient failover and failback techniques in a data storage system, and more particularly to efficient failover and failback techniques for data storage systems utilizing at least dual-active controller configuration for minimizing a delay in responding to input/output requests from a host system following a controller failure.

BACKGROUND OF THE INVENTION

Modern computers, particularly computers operating in a server environment, typically require or at least benefit from a large, fault-tolerant data storage system. Storage devices (such as hard disk drives) in all computer systems are susceptible to failures caused by temperature variations, head crashes, motor failure, controller failure, changing voltage conditions, and mechanical and electrical failure generally. To improve reliability and protect the data in data storage systems, many data storage systems use a redundant array of independent disks (RAID) controlled or operated by a disk array controller. Conventional RAID systems typically consist of several individual disk controllers combined with a rack or enclosure of storage devices to provide a fault-tolerant data storage system that is directly attached to a host computer system. The host system is then connected to a network of client computers to provide a large, fault-tolerant pool of storage accessible to all network clients. Typically, the disk array controller provides the brains of the data storage system, servicing all host requests, storing data to storage devices, such as, for example, RAID drives, caching data for fast access, and handling any drive failures without interrupting host requests.

Disk array controllers may generally include one or both of storage controllers and caching controllers. A storage controller (or non-caching storage controller) is a device which is capable of directing data traffic from the host system to one or more non-volatile storage devices. It may or may not have an intermediary cache to stage data between the non-volatile storage device and the host system. A caching controller (or caching storage controller) is a device which is capable of directing the data traffic from a host system to one or more non-volatile storage devices which uses an intermediary data storage device (the cache memory) to stage data between the non-volatile storage device and the host system. In general, the intermediary storage device is built out of RAM or other solid-state memory to allow a quicker access time to the data. Furthermore, it provides a buffer in which to allow exclusive-or (XOR) operations to be completed for RAID Level 5 (RAID 5) operations.

Multiple active (multi-active) controllers are defined as a collection of storage controllers or caching storage controllers which work in a cooperative manner with each other. They provide the ability for recovering from a controller failure by allowing multiple paths to a storage volume. Dual-active controllers are one example of such multi-active controllers. The storage volume is a contiguous range of randomly accessible sector of data. For practical purposes, the sector numbering starts at 0 and goes to N, where N is the total number of sectors available to the host system. A data extent is a range of data within a storage volume delineated by a starting sector and an ending sector. The storage volume is broken up into a number of data extents which are not required to be of equivalent sizes, but may not overlap. These concepts are used in the discussion of the background and the detailed description of embodiments of the invention, and apply to both.

Caching data by a caching controller into a cache memory increases the performance of data storage and retrieval operations by maintaining a collection of the most recent references to the stored and/or retrieved data made by a host computer. Cache memory can typically be operated in a write-back or write-through mode. In a write-back mode, write data is temporarily stored in the cache and written out to disk at a subsequent time. An advantage of this mode is that it increases the controller's performance. The RAID or other disk or storage array controller notifies a host computer that the write operation succeeded (by sending the host computer a completion status) although the write data has not been stored on the disk.

It is desirable for a data storage system to reliably function with any type of failed component, including a failed disk array controller. Failure of a single disk array controller in a data storage system having a single, or multiple independent controllers, renders the tasks that were being performed by the failed controller, and/or those tasks scheduled to be performed by the failed controller, inoperable.

Worse yet, the failure of a single disk array controller in a data storage system having only one controller, renders the entire RAID system inoperable. (Hereinafter, "disk array controller" is often referred to as "controller" to simplify the description, unless otherwise stated.) To circumvent the problem of a single point of failure that all single controller RAID systems exhibit and provide redundancy to a data storage system, dual active controllers were implemented. Multiply-active controllers provide additional redundancy.

A dual active controller configuration typically consists of a first controller and a second controller coupled to one another (or integrated in some manner), so that in the event of a single controller failure, the surviving controller is able to take over the tasks that were being performed by the failed controller, and perform those tasks that were scheduled to be performed by the failed controller.

To take over the tasks of a failed controller, a surviving controller must keep track of both the tasks that its partner controller is working on, and the tasks that its partner controller is scheduled to work on before the failure occurs. To illustrate this, consider, for example, that a controller fails before data stored in its cache (in response to a write request from a host computer) is written onto a system drive. Data in the cache of a failed controller is lost in the event of an electrical failure unless, for example, the cache memory is provided with a battery backup and the memory itself has not failed. In this situation, it is desirable for a surviving controller to complete the scheduled task of the failed controller by writing the data that was in the failed controller's cache onto the storage device. To accomplish this, a surviving controller in active configuration would need to have a copy, or a mirror of the failed controller's cache. However, state-of-the-art data storage systems are limited because there are no known structure or procedures for copying or mirroring a controller's cache between other different controllers in active configuration.

Therefore, there remains a need to overcome the above limitations in the existing art which is satisfied by the inventive structure and method described hereinafter.

SUMMARY

The present invention overcomes the identified problems associated with conventional systems and methods by providing an efficient failover and failback technique in a data storage system. More specifically, the invention provides a method for efficient failback technique in a data storage system utilizing a dual-active controller configuration for minimizing a delay in responding to input/output (I/O) requests from a host system following a controller failure. A stripe lock data structure is defined to maintain reservation status or stripe locks of cache lines within data extents that are part of a logical unit or storage volume. When a controller fails, dirty cache line data of a failed controller is taken over by a survivor controller. The stripe lock data structure is used to process I/O requests from a host system, by the failed controller. The data storage system functions in a single-active configuration until the dirty cache line data is flushed to one or more storage volumes, by the survivor controller. Once the dirty cache line data is flushed to the system drive, the data storage system continues processing host I/O requests in the dual-active or multiply-active configuration.

The inventive structure and method provide a storage volume reservation system in a computing environment that allows data access through two or more caching controllers. The stripe lock data structure is defined in memory within each of the two or more caching controllers. The stripe lock data structure is used to provide consistent information within each of the two or more caching controllers. In addition, the stripe lock data structure is used by a failed controller to process I/O requests from a host system until dirty cache line data is flushed to one or more storage volumes by a survivor controller.

A computer program and computer program product for efficient failover and/or failback in a data storage system is also provided, a data storage system managed in dual active controller configuration is also provided which includes a computer readable medium and a computer mechanism stored thereon for implementing the inventive method and procedures thereof. Method and structure which minimizes a delay required to begin processing of host I/O request following a controller failure are also advantageously provided.

BRIEF DESCRIPTION OF THE DRAWINGS

Additional advantages and features of the invention will become readily apparent upon reading the following detailed description and appended claims when taken in conjunction with reference to the following drawings, in which:

DETAILED DESCRIPTION OF EMBODIMENTS OF THE INVENTION

Figure 1:
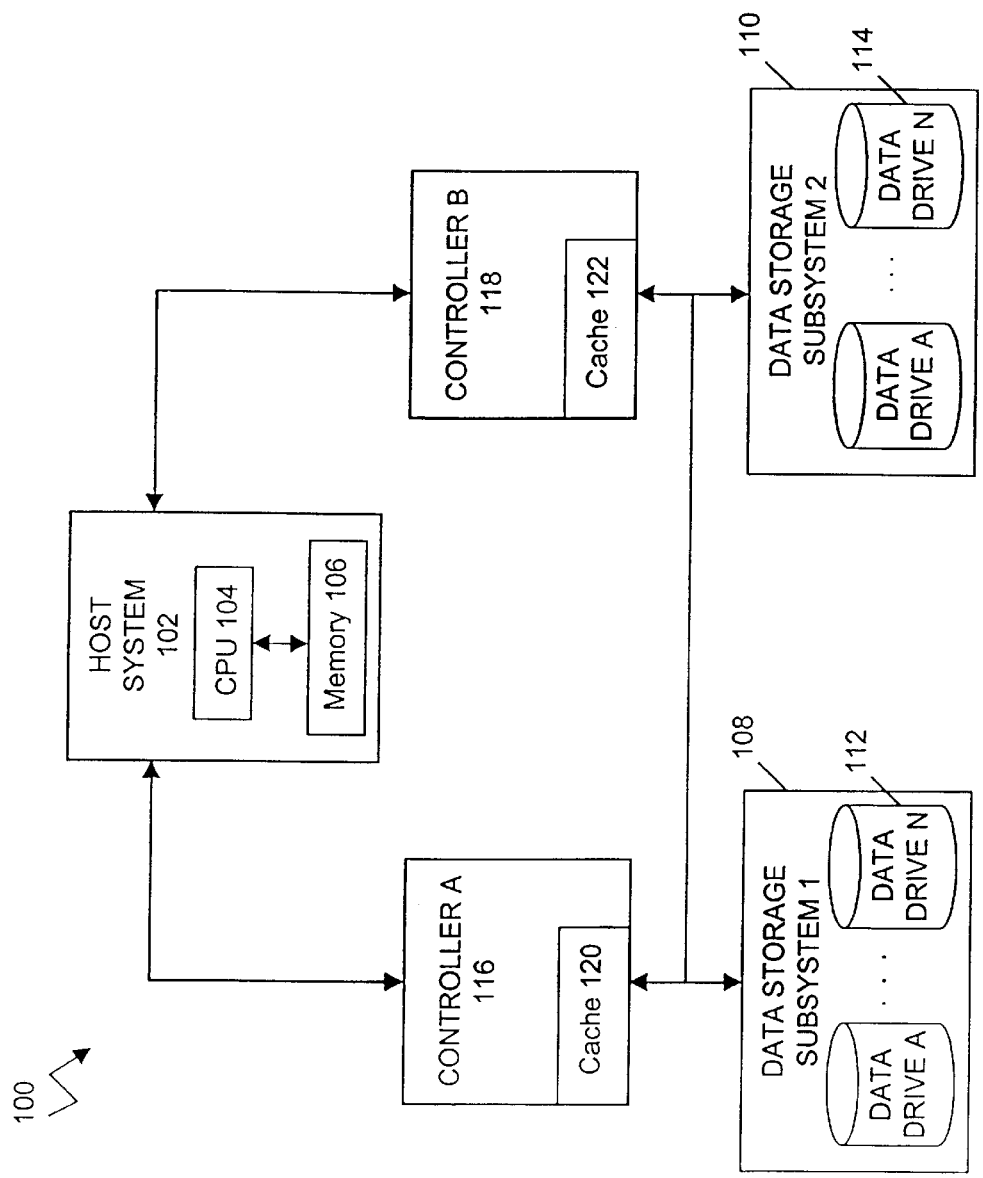
FIG. 1 is a diagrammatic representation of an exemplary computer system to which the inventive structure and method may be applied.

One technique for overcoming the controller failure problem described in the Background above is a cache mirroring system, apparatus and method for a dual-active controller environment as described in co-pending U.S. patent application Ser. No. 09/410,168 filed Sep. 30, 1999 and entitled System, Apparatus & Method Providing Cache Data Mirroring To A Data Storage System, assigned to the assignee of the present invention and hereby incorporated by reference. Referring to FIG. 1, a data storage system 100 utilizing a dual-active controller configuration is depicted. In accordance with the cache data mirror method, a Controller A (primary controller) 116 receives a write data request from the host system 102, the write data request includes data to be written by the primary controller 116 to the storage subsystem. The primary controller 116 caches the data into the primary controller 116 cache memory 120. Next, the primary controller 116 mirrors the data to Controller B (alternate controller) 118, such that the alternate controller 118 copies the data into an alternate controller cache memory 122, thereby providing a backup copy of the primary controllers 116 data in case of a controller failure.

Figure 2:
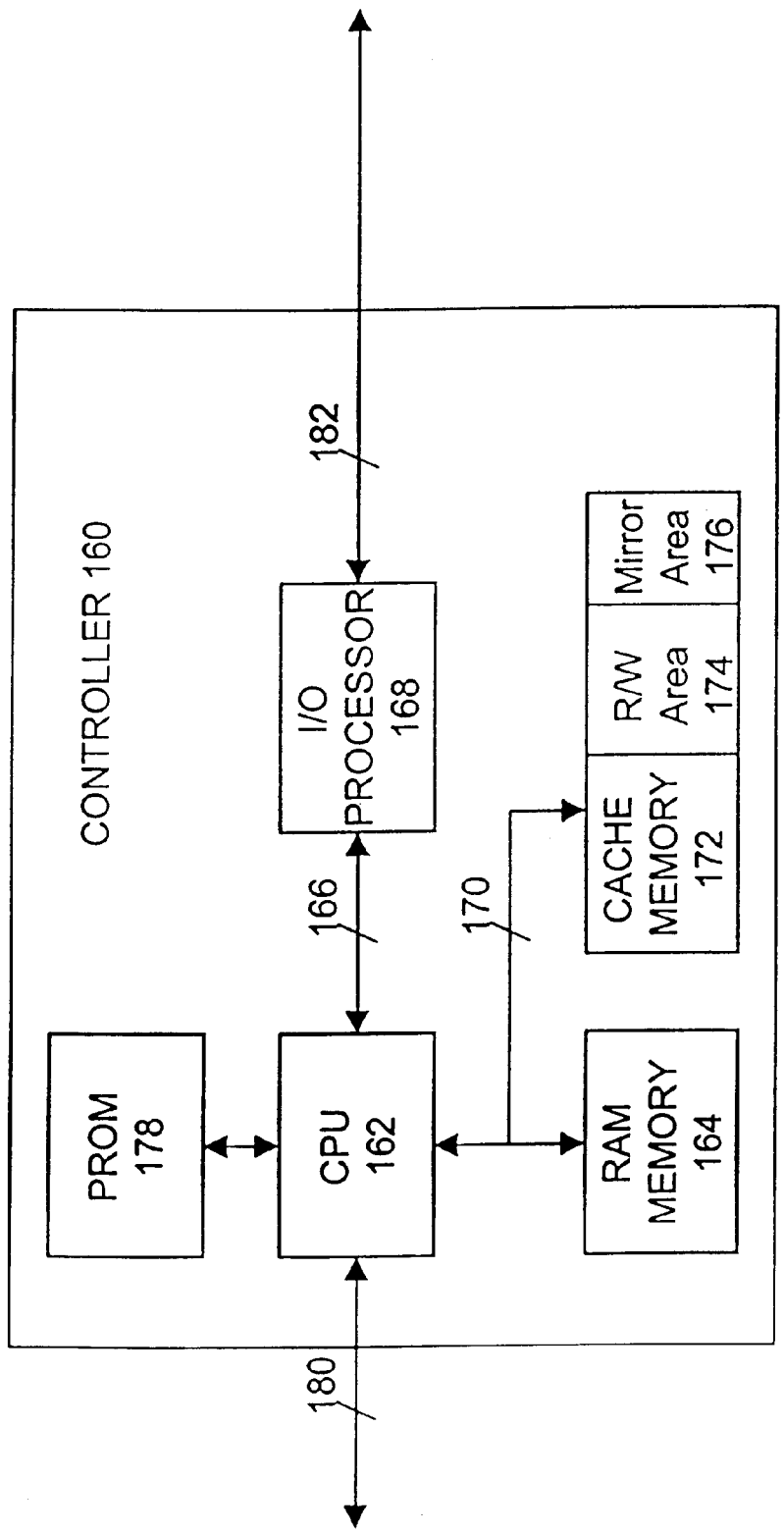
FIG. 2 is a diagrammatic representation of an exemplary controller to which the inventive structure and method may be applied.

Referring to FIG. 2, an exemplary controller 160 is depicted. The controller 160 includes a CPU 162, a PROM 178, RAM memory 164, and a cache memory 172. The cache memory 172 includes a read/write (R/W) cache area 174, and a mirror area 176. The R/W cache area 174 is used as an intermediate storage area for cache line data in order provide the host system 100 optimized access to the cache line data without having to access the storage subsystem 108, 110. The mirror area 176 is used to store a backup copy of cache line data (backup data) mirrored from a partner controller. The mirror area 176 is provided to allow a survivor controller to take over the tasks and cache line data of a failed controller. However, in the event of a controller failure, the survivor controller must perform several task before resuming processing of host I/O requests. Procedures involved with the inventive method may be implemented as one or more computer programs as software and/or firmware stored in a memory of the controller, such as in PROM 178 or other memory and executed by processor 162 in conjunction with RAM memory 164. Desirably, the computer program(s) implementing the inventive procedures is stored in a non-volatile storage memory so that it is retained in memory in the event of the any intended or unintended loss of power to the memory.

In the event of a controller failure, the surviving controller, for example the primary controller 116 will have a copy of the failed controller's, for example the alternate controller 118, cache line data in the mirror area 176 of the survivor controller's 116 cache memory 120. Once a controller failure is detected by the survivor controller 116, the survivor controller 116 will enter failback mode. During failback mode, the survivor controller 116 will move the failed controller's 118 cache line data from its mirror area 176 into its R/W area 174 in order to flush the backup data to the storage volume 108, 110. This requirement is imposed in order to ensure that the failed controller's 118 cache memory 122 contains no data (dirty data) that has not been synchronized with the storage volume 108, 110. As such, any dirty cache line data of the failed controller 118 must be flushed to the storage volume 108, 110 in order ensure data synchronization between the survivor cache memory 120 and the storage volume 108, 110. In addition, once the dirty cache line data is flushed to the storage volume 108, 110, the survivor cache memory 120 can be re-segmented to included both a R/W area 174 and a mirror area 176 in order to allow cache data mirroring from the failed controller 118. Finally, a host ID is passed back to the failed controller 118 (once re-booted) in order to allow the failed controller 118 to begin accepting host I/O requests.

Unfortunately, while the survivor controller 116 is in failback mode, the host system 102 may either receive BUSY signals or selection timeouts in response to host I/O requests. For large caches and small stripe sizes, flushing of the dirty cache line data to the storage volume 108, 110 during failback mode can take on the order of minutes. However, many host systems 102 are intolerant of controller responding busy or responding with selection timeouts either more than a fixed amount of time or more than a defined number in succession. Hence even this improvements over conventional systems and methods suffer from certain limitations.

The present invention overcomes these and other of the above identified problems by providing efficient failover and failback techniques in a data storage system. Failover generally refers to the redirection of calls to an alternate device (for example to a server or controller) if the intended device is not responding due to a lost connection, application failure, controller failure, or other machine failure or unavailability. Failback redirects calls back to the originally intended device whenever the originally intended device becomes available again. The inventive failover and failback techniques and procedures are desirably used together (any may be viewed as a single integrated procedure) but may be used separately and/or in conjunction with other conventional techniques. Advantages of the inventive include a method and structure which minimizes a delay required to begin processing of host I/O request following a controller failure. More specifically, the invention provides a method for efficient failback technique in a data storage system utilizing a dual-active controller configuration, for example as depicted in FIG. 1, for minimizing a delay in responding to input/output (I/O) requests from a host system following a controller failure.

The invention provides structure, method, and computer program for input/output request failover to a survivor controller when an intended controller (failed controller) becomes unavailable for some reason and structure, method, and computer program for failback to the intended controller from the survivor controller when the intended controller is again available.

Failover characteristics are now briefly described. After a controller has failed, it is the partner controller's responsibility to write any data to disk which the failed controller did not commit to disk. After this has been accomplished, it then take over for the failed controller and starts accepting I/O that would have been sent to the failed controller.

The data which needs to be written to disk is obtained from the mirror area in the cache. When a controller receives a write I/O, before it can return status back to the host, it must copy the data to its partner's mirror area. The available memory which can be used for I/O operations is divided up into two sections. A first section provides a read/write area in which data which is received from the host or destined for the host is maintained. The second section is the mirror area where copies of the partner's write I/O's are stored.

After all the write data for the failed controller is ready to be committed to disk, the mirror area is available for use as read/write area. This happens since the partner controller has failed and will not be sending copy data to this controller.

Also, during this time, all the stripe locks which were held by the partner controller are released and fill locks are granted to the survivor controller. A fill lock means that the owning controller has complete read/write access for the line for which it owns the full lock.

The final step is for the survivor controller to accept the I/O which would have been routed to the failed controller. This is done by one of two methods. In a first procedure, the failed controller is impersonated using its ID. In a second procedure, this is done using a failover driver on the host. The failover driver handles rerouting data without any intervention on the part of the controller.

In an exemplary failback procedure, the cache is first reorganized into a read/write area in the mirror area. To do this, the write data that is stored in the area which will become the mirror area must first be flushed to disk. After the write data is flushed to disk, any cache lines which are contained in the area which will become the mirror area, need to be removed from the hash table.

The next step prior to allowing the replacement controller to start accepting I/O is to flush data which is normally handled by the replacement controller to disk, and remove those cache lines from the hash table. The inventive structure and method provide particularly valuable improvements for these two steps. After all of that data (e.g. data which is normally handled by the replacement controller) is handled (i.e. removed) from the cache, replacement controller is allowed to start accepting I/O.

In the inventive failback procedure, the survivor controller allows the replacement controller to accept host I/O at a much earlier time than in the conventional failback techniques. This can happen since the requirement to flush the mirror cache area in any I/O's which are normally intended for the replacement controller prior to allowing the replacement controller to accept I/O is removed. This can be done due to the locking structure and method which provide a mechanism which insures data is consistent on disk prior to a lock being granted. This allows the reorganization of the cache, the switch from a single read/write area to one which has both a read/write area and a mirror area, to take place while I/O was going on to both controllers.

The inventive techniques provide very efficient, low-overhead means for bringing a replacement controller back online that dramatically improve performance of the I/O bandwidth when reorganizing the cache to allow full dual-active operation. The benefits are particularly pronounced when applied to controllers having large to vary large caches.

The inventive structure and method will allow controllers to operate with very large caches as compared to relatively smaller caches conventionally employed. The inventive structure and method benefit from holding off or delaying host I/O for some period of time while the caches are being reorganized. This amount of time increases more or less linearly with increasing cache size. Normally, if the time which the host I/O is held off exceeds a certain threshold, the host will fail I/O which may lead to data corruption.

However, the present invention removes the connection between cache size and the amount of time the host I/O must be held off or delayed. Instead, the time in which host I/O must be held off or delayed is simply how longs it takes to tell the replacement controller that it can start accepting host I/O. The reorganization of the cache takes place while host I/O is going on to both controllers. One restriction which may be imposed is that data is not mirrored between the controllers until the cache your renovation is complete.

Particular embodiments of the invention are now described. A stripe lock data structure is initially defined in a memory to maintain reservation status or stripe locks of cache lines within data extents that are part of a logical unit or storage volume. In one embodiment, the strip lock data structure is a data structure defined in a memory of both controllers, such as for example a RAM or random access-type memory, which stores data or other information pertaining to for example, the controller codes, execution stream, and various data structures. More specifically, in one embodiment, the stripe lock data structure pertains to a RAID configuration and stores which controller owns which areas of a particular storage volume. An exemplary stripe lock data structure illustrating the associations between LUN, starting sector, number of blocks, controller ownership of lock, and lock state (e. g. granted, requested, acknowledged, free) is illustrated in Table I. Additional aspects, structures, and method associated with providing and maintaining stripe locks are described in co-pending U.S. patent application Ser. No. 09/540,774 filed Mar. 31, 2000 and entitled Warm Start Cache Recovery in a Dual Active Controller with Cache Coherency Using Stripe Locks for Implied Storage Volume Reservations, which is hereby incorporated by reference.

TABLE I

Exemplary stripe lock data structure (reservation status data structure) for a RAID 5 Storage Configuration and Dual-Active controllers.

{LUN}
{starting sector}
{number of blocks}
{lock owner} → controller identifier
{lock state} → granted, requested, acknowledged, free Recall that in a dual-active configuration, each controller has two (i.e. dual) active ports for performing input/output operations to the controlled devices. Typical data storage systems include dual-active (or multiply-active) controllers configured such that a first active port of the first controller is connected to a host loop and is normally responsible for controlling I/O from a set of hosts (A) also acts to control I/O from another set of hosts (B) wen the partner controller fails. Similarly, a second active port of the first controller may be connected to another host loop and accepts I/O from host set (C) and normally responsible for controlling I/O to those hosts (C) and only acts to control I/O from host set (D) when its partner fails. The first and second active ports of a second controller are connected in analogous manner to provide redundancy for the other controller in addition to increased performance. If the dual-active controller fails completely, such as when a hardware component fails or a code exception occurs, then both of the ports may become unavailable or non-operational and as a result a controller failover takes place. The more typical failure mode for a dual-active controller is to have a code exception take place in which one controller is rendered unuseable. Hence, in the context of the present description, failure of a controller refers to failure of both of the two-active ports. In the event that both active ports should fail or become unavailable at the same time, then the partner controller takes over for the failed controller.

When a controller fails, dirty cache line data of a failed controller is taken over by a survivor controller. The survivor controller takes over the dirty cache line data by adding dirty cache lines in the mirror area to its hash table and its write back queue. The data storage system functions in a single-active configuration (rather than in a dual-active configuration) until the replacement boots up and starts accepting I/O which is mirrored to the partner controller. By single active configuration, it is meant that the survivor controller is not mirroring its write data to an alternate location and the failed controller is not providing redundancy in the system, and as a result, the data is vulnerable to a second point of failure.

It is noted that the stripe locks are not used after a failover, rather, they are used during failback to allow I/O to start going to the replacement controller without requiring that all data is flushed from the survivor's data cache. In this sense, some of the failover discussion is only provided to assist in understanding how the failback is improved by the inventive structure and method.

Embodiments of exemplary system and method and manner of operation are now described. Computer system configurations involving one or more host computers and having two or more controllers that use cache technologies, with access to a storage device through any of the controllers, should desirably provide some mechanism of ensuring that the cache data in each controller is always correct (data consistency). Data consistency refers to all controllers providing visibility to one identical copy of the data. Data consistency can be provided through data synchronization, though data coherency, or by using both of these techniques. Data coherency refers to maintaining a consistent copy of the data in each of the controller's primary controller and alternate controller) caches. Data synchronization refers to keeping the data in the storage controller's cache the same as that in the storage device. Unfortunately in conventional systems, mechanisms for ensuring data consistency do not exist.

Figure 3:
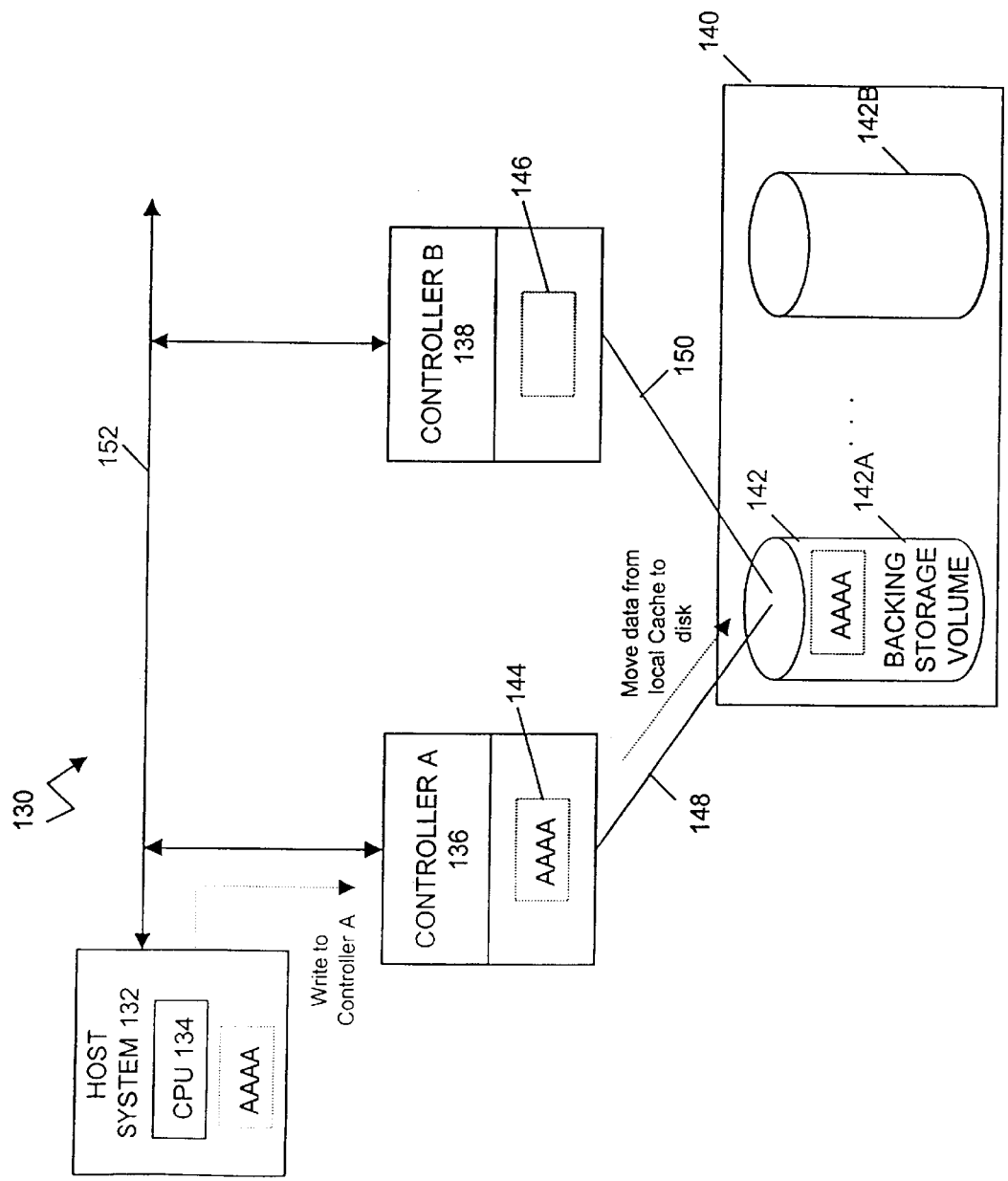
FIG. 3 is a diagrammatic representation of an exemplary host computer request to write data to a first controller in a dual-active controller environment.

The following description is provided relative to FIG. 3, and sets forth some of the issues associated with data synchronization between controllers which maintain local cached copies of data.

This example details one set of host transactions that could cause data integrity problems, that is, data consistency and data synchronization problems. The data consistency problem is brought about by the fact that each controller's cache operates independently.

With reference to the illustration in FIG. 3, there is shown a portion of computer system 130, including host computer system 132 having a processor or central processing unit (CPU) 134, first controller (Controller "A") 136, second controller (Controller "B") 138, a storage subsystem 140 including at least one backing storage volume 142. Each of the two controllers 136, 138 further separately include first cache (Cache "A") 144 and second cache (Cache "B") 146 for caching data retrieved from backing storage volume 142 (for example, backing storage volume 142A). Generic techniques for controller caching are known in the art and may be used and are therefore not described in further detail here.

Backing storage volume 142 is coupled to each of first and second controllers 136, 138 by storage interface channels 148, 150, and the host computer processor (CPU) 134 is coupled to the controllers by CPU-to-storage device interface 152. A backing storage volume is a non-volatile media which the data is placed on or in. The backing storage is a place where the data is stored and may be any storage media, such as for example, solid state storage, optical storage media, tape storage media, or a magnetic disk storage media or system. Note that each of these controllers may operate as both primary and alternative controllers albeit at different times or relative to different sets of storage volumes or units. The interface 152 may typically be implemented as a Personal Computer Interface (PCI), parallel SCSI, fibre channel, IEEE-1394 (fire-wire) interface, or other interfaces as are known in the art, using for example, a storage, file system, or other communications protocol. In analogous manner, the controller-to-storage device interfaces 148, 150 may typically be implemented using the one or more interface types selected from the set of interfaces and protocols as just described for interface 152. A logical unit number (LUN) is assigned or otherwise associated with each backing storage volume 140. The relationship between physical devices or portions thereof and logical devices is known in the art and not described in further detail here.

In this configuration, if data is written to a logical unit, such as backing storage volume 142A through first controller 136, the data is properly retained in the first controller's cache, that is within cache 144. If data is subsequently written to logical storage unit 142A through second controller 138, the newly written data in backing storage volume 142A matches the data in the second controller's cache 146, but the information in the first controller's cache 144 will not have been updated, and (if the newly written data is different from the original data) no longer matches the data written to the backing storage volume 142A. If a request to read the data is made through first controller 136, the data will be read from cache 144 according to standard data caching and retrieval practices to minimize backing storage volume access, and the wrong information will be returned to the requestor. The data is said to lack coherency between different locations (that is between one or more of the backing storage volume, cache 144, and cache 146), and is out of temporal synchronization as a result of the time-order of events involving the read, write, and caching operations.

Figure 4:
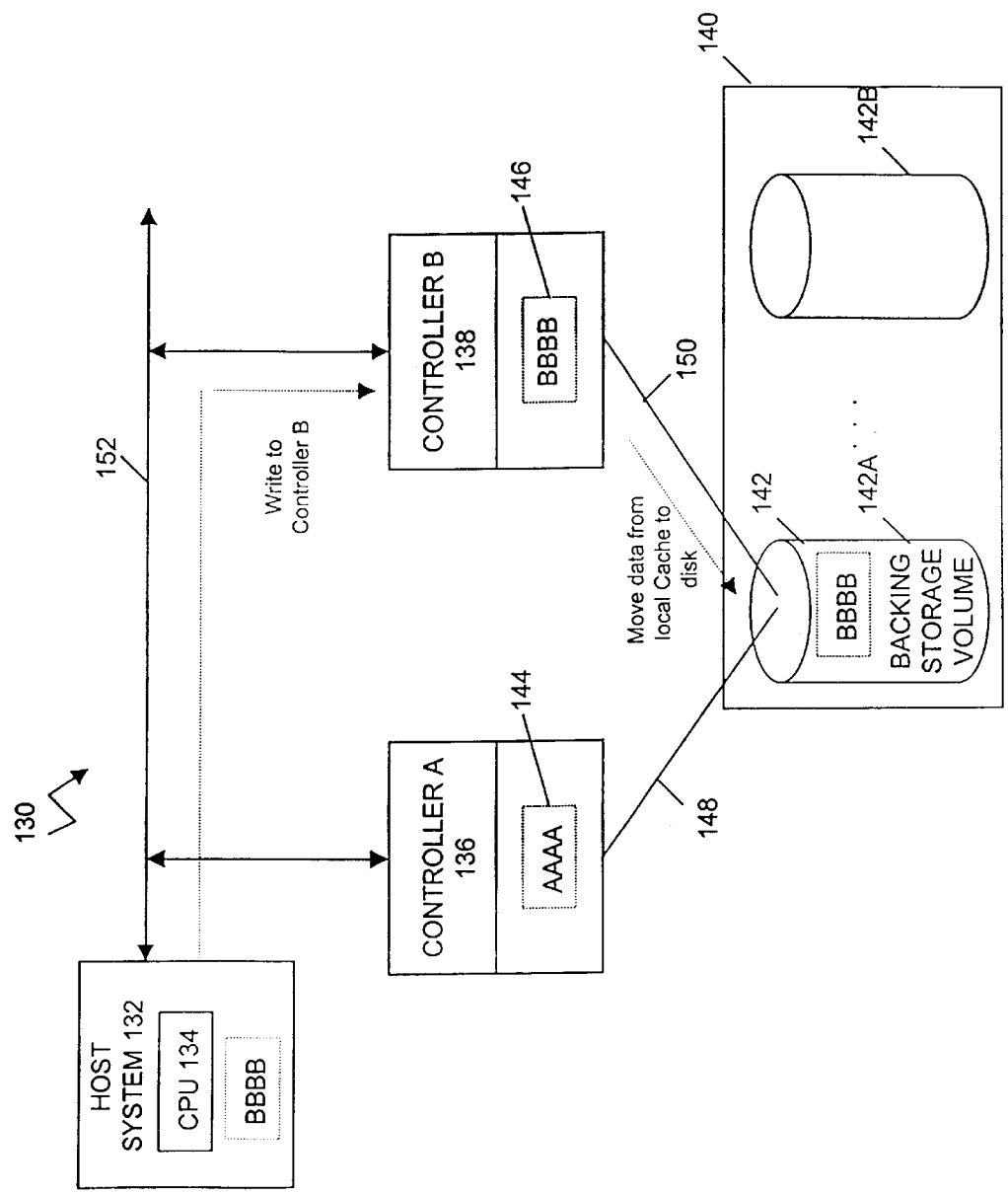
FIG. 4 is a diagrammatic representation of a host computer request to write data to a second controller in a dual-active controller environment where the write request is to the same storage device sector as in FIG. 3.

Stating the problem by way of example in somewhat more concrete terms, in a system with two controllers 136, 138 attached to the same CPU/storage interface and sharing access to a backing storage volume 142, as illustrated in FIG. 4, host computer 132 writes data pattern "AAAA" to the backing storage volume through first controller 136. First controller 136 retains this information in its data cache 144 so that future requests for the data can be fulfilled without having to access the disk backing storage volume 142A. At a later time, the host computer writes the data pattern "BBBB" to backing storage volume 142A at the same location the "AAAA" data pattern had been stored, but now the write operation is directed through the second controller 138 as illustrated in FIG. 3 and FIG. 4. First controller 136 still has the "AAAA" data pattern stored in its cache 144, but second controller 138 has the "BBBB" data pattern stored in its cache 146. The data in first controller (Controller A) cache 144 ("AAAA") and the data in second controller (Controller B) cache 146 ("BBBB"), each supposedly representing the identical data, no longer match and are incoherent.

The correct (newer) data pattern on backing storage volume 142A ("BBBB") is the later data pattern also stored in cache 146 ("BBBB"), but if the host computer 132 attempts to read the information from backing storage volume 142A through first controller 136, first controller 136 will, using conventional techniques, be unaware of any controller 138 operations, and in particular will be unaware that a write operation has altered the data (from "AAAA" to "BBBB") on the backing storage volume 142A. Using conventional techniques and lacking knowledge that the data has changed, first controller 136 will access it's own cache 144 to retrieve the data, and erroneously return that data pattern ("AAAA") rather than the correct data pattern ("BBBB") to the requesting host computer 132.

One technique for overcoming the data consistency problem described above is a storage volume reservation system and method as described in co-pending U.S. patent application Ser. No. 09/325,033 filed Jun. 3, 1999 and entitled System and Method of Maintaining Cache Coherency And Data Synchronization In A Computer System Having Multiple Active Controllers, which is hereby incorporated by reference. The storage volume (or storage LUN) reservation system for active controllers in an environment allows data access through two or more separate caching controllers. The locking mechanism described maintains a "reservation table" (such as a LUN reservation table) that is always consistent on each of the plurality of controllers. This structure and method also provide the capability of explicitly reserving storage volumes using any current storage volume (or LUN) reserve commands, or implicitly using a write operation. The inventive structure and method also provide the capability of invalidating a controller's cache based on acquiring new reservation. When the lock is transferred between controllers, the prior owners cache is invalidated over the area of the lock.

The storage volume reservation system and method provide that each controller is not required to reserve a storage volume in order to perform an update to that storage volume. Neither is the host required to explicitly reserve a volume to insure data integrity between controllers. Instead, when a host performs an I/O (logical unit, starting block, number of blocks, read or write) to a controller (A), this causes an implied reservation to take place. This means that the other controller (B) invalidates its cache (synchronizes to disk) and does not accept any other host writes until it obtains the reservation from the other controller (A). The controller maintains these reservations in a table of sector locks on a LUN basis.

Note for example, that if a controller (A) has an Explicit Reservation (e.g. one that is obtained through a SCSI reserve command), the partner controller (B) will not accept any I/O for the reserved LUN. This is due to the SCSI protocol. Since it cannot accept any I/O, it cannot obtain an explicit reservation. If controller (A) releases its explicit reservation (for example, through the SCSI release command) and then I/O is sent to controller (B), controller (B) will then obtain an implicit reservation.

An explicit reservation may be made through the use of Storage Volume Reserve commands, while an implicit reservation is made whenever a write operation requires that the particular controller obtain a reservation. Implicit reservations may occur, for example, when an alternate controller already owns the reservation. The reservation may also be obtained implicitly when the controller is required to perform a read operation, and the alternate controller already owns the reservation. Implicit reservations are only required so that cache coherency may be obtained. For example, to ensure that the alternate controller's cache contains no data (dirty data) that has not been synchronized with the storage volume drive. The requirement is handled by the controller firmware and places no requirements on the host system or systems.

The reservation process is synchronized between all of the controllers in the system in order to maintain reservation table coherency. All updates to the reservation table are propagated to the alternate controllers to maintain reservation table coherency. This procedure allows most reads and writes to be performed with minimal overhead; only when the I/O path switches from one controller to the other controller might the overhead not necessarily be minimized during that operation. An input/output (I/O) operation to a storage volume that is reserved by that controller only needs to check for that ownership before processing the I/O operation request. This check in made through a query to the lock owner field in the reservation table. If the lock owner field is set (for example to a logic "1") then the storage volume is owned by the controller, otherwise it is not owned.

The reservation table is a data structure defined in a memory of each controller. Pseudo-code defining an exemplary reservation table data structure and Lock Table data structure are provided immediately below. There is one reservation table entry for each LUN.

---

Reservation Table Data Structure

{
    Boolean FullLock;    {if this is set (1), this controller owns a lock which encompasses the entire LUN}
    Locktable  locks [max_Locks];
    u32         numberLocks;
}
Lock Table Data Structure {
    u32    initialSector;    {first block which is locked by this controller}
    u32    numberSectors;  {number of sectors this lock encompasses}
}

---

The reservation process also benefits from cache flushing and cache invalidating in some circumstances to maintain data integrity. Cache flushing refers to the process of moving data, which is in cache memory and inconsistent or dirty with respect to the current data on disk, to disk. Cache invalidating refers to the process of removing cache lines from the hash table when they are consistent with the data on disk. Various techniques for cache flushing and cache invalidating are known in the art and are not described in greater detail here.

Obtaining a reservation to a storage volume or portion thereof that is not owned by any controller is straightforward and only requires an update to the reservation table, and it's propagation to all alternate controllers. The reservation table is updated by the controller which now owns the lock and the changes are propagated to each of the alternate controllers through controller-to-controller messages. Obtaining a reservation to a particular storage volume or portion thereof currently owned by an alternate active controller further requires that the alternate controller flush and invalidate all cache data associated with that particular storage volume. Releasing a reservation is not required. because for example, when a release is needed the controller which requires the reservation will request it causing the release, but may optionally be performed using storage volume release command. When optionally implemented, the reservation is released by modifying the ownership flag to "unowned" in the reservation table. It is kept tracked of through a use count and an owner flag. If the use count is zero (0), another controller may be granted the lock (reservation).

Figure 5:
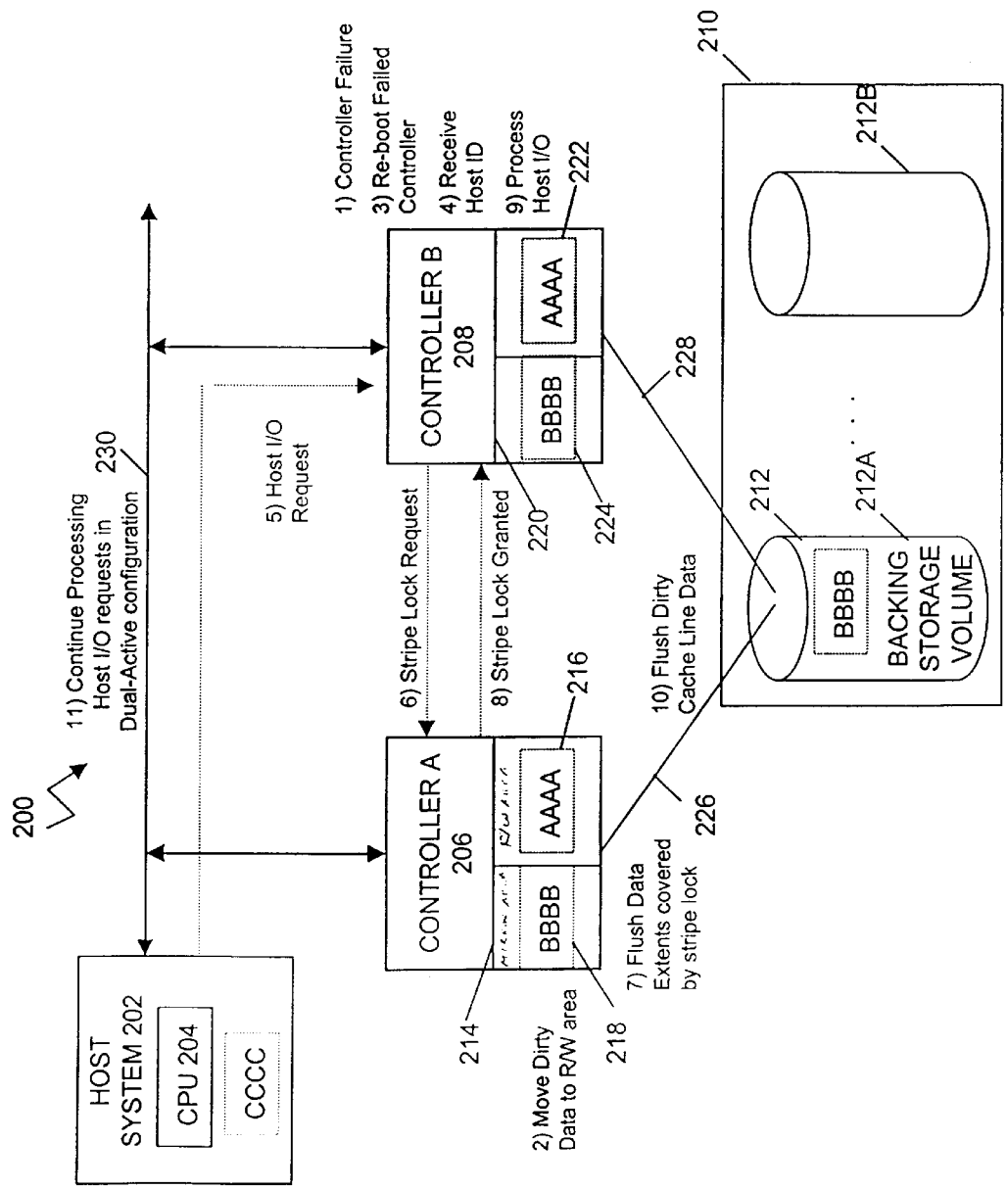
FIG. 5 is a diagrammatic representation of an efficient failback in a dual-active controller environment utilizing stripe locks according to an embodiment of the invention.

FIG. 5 depicts an example of data storage system 200 in a dual-active configuration for implementing the efficient failback technique as taught by the present invention. The data storage system 200 is generally configured as shown and described relative to FIG. 1 except for the other features described here, utilizing controllers 206 and 208 in a dual-active configuration. The controllers 206 and 208 are configured as described with reference to FIG. 2, including a cache memory 214 and 218 having an R/W area 216, 222 and a mirror area 218, 224. Referring again to FIG. 5, the data storage system 200 is depicted in a state where controller A 206 (primary controller) contains a data pattern "AAAA" in its R/W cache area and controller B 208 (alternate controller) contains a data pattern "BBBB" in its R/W cache area. In addition, the respective data patterns are mirrored to the mirror areas 218, 224 of the primary controller 206 and the alternate controller 208. Recall that the data patterns are mirrored when write data is received to insure it is not lost if a controller fails before the data is destroyed to disk.

Various events that occur within the system and the response taken by the inventive failback method are indicated in FIG. 5 and now described. The efficient failback technique, as taught by the present invention, is initiated by the occurrence of a controller failure, for example, failure of the alternate controller (Controller B) 208, as indicated at (1) in FIG. 5 "Controller Failure". Once the survivor controller, for example the primary controller (Controller A) 206, detects a controller failure, the dirty cache line data of the failed controller 208 is moved from the mirror area 218 of survivor controller 206 to the R/W area 216 of the survivor cache memory 214 as indicated at (2) "Move Dirty Data to R/W area". The failed controller 208 is then re-booted as indicated at (3) "Re-boot Failed Controller". Once the failed controller 208 is re-booted, the survivor controller 206 will pass a host ID which is used to establish itself on the Host Loop. This is the ID the controller will respond to when a host wants to communicate with it. The Host ID is used to allow the controller to establish itself on the host loop 230 and is needed by the controller in order to allow other devices, such as the Host System 202, to address it. Once the failed controller 208 has received the host ID as indicated at (4) "Receive Host ID", host I/O requests can be accepted as indicted at (5) "Host I/O Request". Having accepted a host I/O request, the failed controller 208 requests a stripe lock for data extents encompassed by the host I/O request as indicted at (6) "Stripe Lock Request". A stripe lock is a region of a LUN that encompasses the I/O request and insures that data is consistent between the controller caches. The existence of a stripe lock request for a data extent is indicated in the reservation table by the LockTable data structure.

In response to the stripe lock request, the survivor controller 206 will flush data extents covered by the stripe lock to the backing or non-volatile storage volume as indicted at (7) "Flush Data Extents Covered by Stripe Locks". Flushing data extents covered by the stripe locks to the storage volume assures that the data on the backing media is consistent with what the host has written to the controller. Once the data extents are flushed to the storage volume, the survivor controller 206 will grant the stripe lock to the failed but now rebooted controller 208 as indicted at (8) "Stripe Lock Granted". Using the stripe lock, the rebooted failed controller 208 will process the host I/O request including additional host I/O requests in a single-active configuration as indicted at (9) "Process Host I/O". The single-active configuration is enabled (as compared to a dual-active configuration) at this stage because the data in the mirror area may not all be flushed to disk, thus, the data cannot be mirrored (copied) between the controllers at this stage. As the rebooted controller 208 processes additional host I/O requests, the survivor controller 206 continues flushing dirty cache line data of the failed controller 208 as indicted at (10) "Flush Dirty Cache Line Data". Once all of the dirty cache line data of the failed and now rebooted and operating controller 208 is flushed to the storage volume, the survivor controller 206 and the failed controller 208 can begin processing host I/O requests in a dual-active configuration as indicated at (11) "Continue Processing Host I/O Requests In Dual-Active Configuration". This means that the mirror area now contains no data and can start being used to backup write data from the partner controller. Procedural method steps for practicing an embodiment of the efficient failover technique and operation of the system in conjunction with this technique as taught by the present invention are now described with respect to the flow-chart diagram of FIG. 6.

Figure 6:
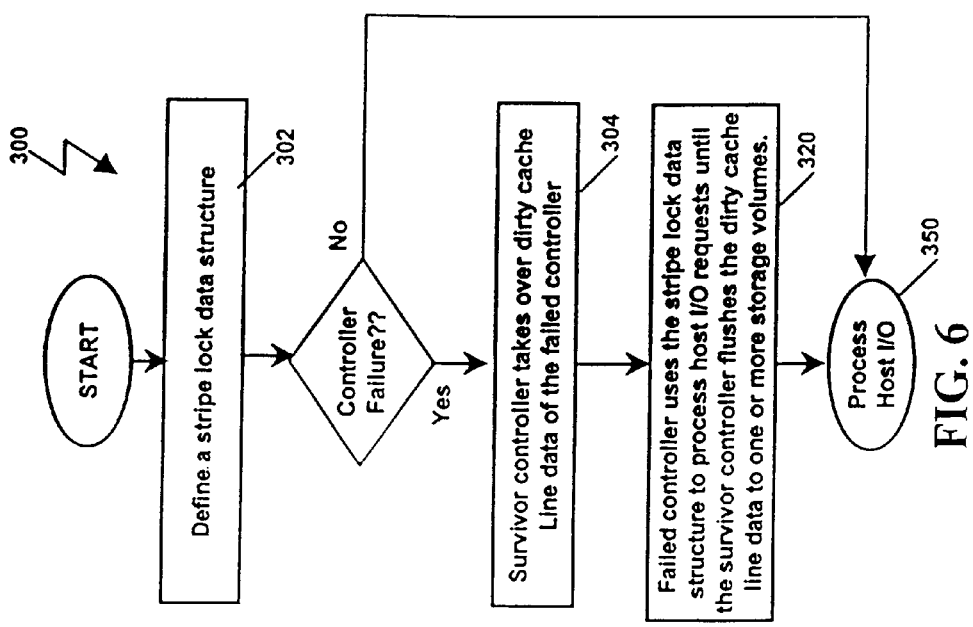
FIG. 6 depicts method steps for an efficient failback in a dual-active controller environment utilizing stripe locks according to an embodiment of the invention.

FIG. 6 depicts an embodiment of a method for an efficient failover technique 300 in a data storage system 200, for example, as depicted in the embodiment of FIG. 5. At step 302, a stripe lock (or reservation status) data structure is initially defined to maintain reservation status or stripe locks of cache lines within data extents that are part of a logical unit or storage volume 212. At step 304, when a controller fails, dirty cache line data of a failed controller 208 is taken over by a survivor controller 206. At step 320, the stripe lock data structure is used to process I/O requests from a host system 202, by the failed controller 208. The stripe lock is used to insure that the caches are consistent with that on disk when the lock granted. They are only needed in dual-active controller mode and upon failure the survivor owns all of the stripe locks. The data storage system 200 functions in a single-active configuration until all of the dirty cache line data is flushed to one or more storage volumes 212 by the survivor controller 206. Finally at step 350, once all the dirty cache line data is flushed from the mirror area to the disk drive, the data storage system 200 continues processing host I/O requests in the dual-active configuration. Host I/O may actually continue as soon as the mirror area is reorganized into the read/write area, that is, when the dirty cache lines are added to the hash table and the write back queue.

Figure 7:
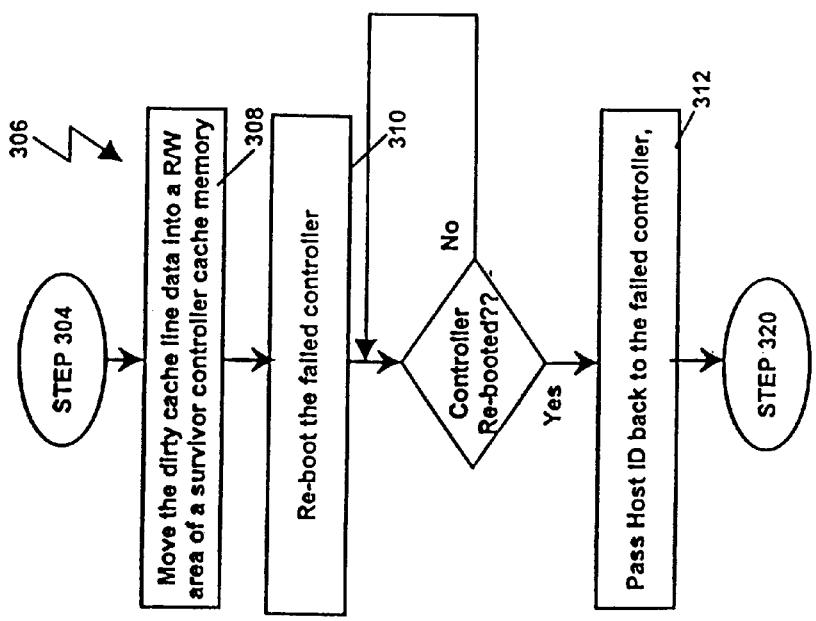
FIG. 7 depicts additional method steps for taking over dirty cache line data of a failed controller according to an embodiment of the invention.

FIG. 7 depicts procedural method steps 306 according to one embodiment of the invention for taking over the dirty cache line data of the failed controller 208, by the survivor controller 206, of step 304, for example, in the data storage system 200, as depicted in the embodiment of FIG. 5. At step 308, the dirty cache line data is moved from the mirror area 218 into a read/write area 216 of a survivor controller 206 cache memory 214. As a result, the cache memory 214 of the survivor controller 206 will no longer have a valid data stored in the mirror area, and therefore cannot accept mirror data from the alternate controller. At step 308, the failed controller 208 is re-booted. Re-booting the failed controller provides a signal so that the "new" controller may be taken out of reset and allowed to boot to a known point, From that point, the survivor instructs the replacement when to start accepting Host I/O. In the event that the failed controller cannot be rebooted, such as for example, when the controller failure is due to a hardware problem, then after a time-out period it will be put back into reset. If the replacement, either a brand new controller or the original controller that failed, cannot be rebooted, it will go back into failed state. Finally at step 312, once the failed controller 208 has re-booted, a host ID is passed back to the failed controller 208. Having host ID of the host system 202 enables the failed controller 208 to being accepting of I/O requests from the host system 202. The host ID is needed in order to accept I/O requests because the survivor controller needs to impersonate the failed controller. Also, in the event the failover driver procedure is used instead of the impersonation procedure, the ID is not needed. The rerouting of data is handled by the host driver instead of at the controller level.

Figure 8:
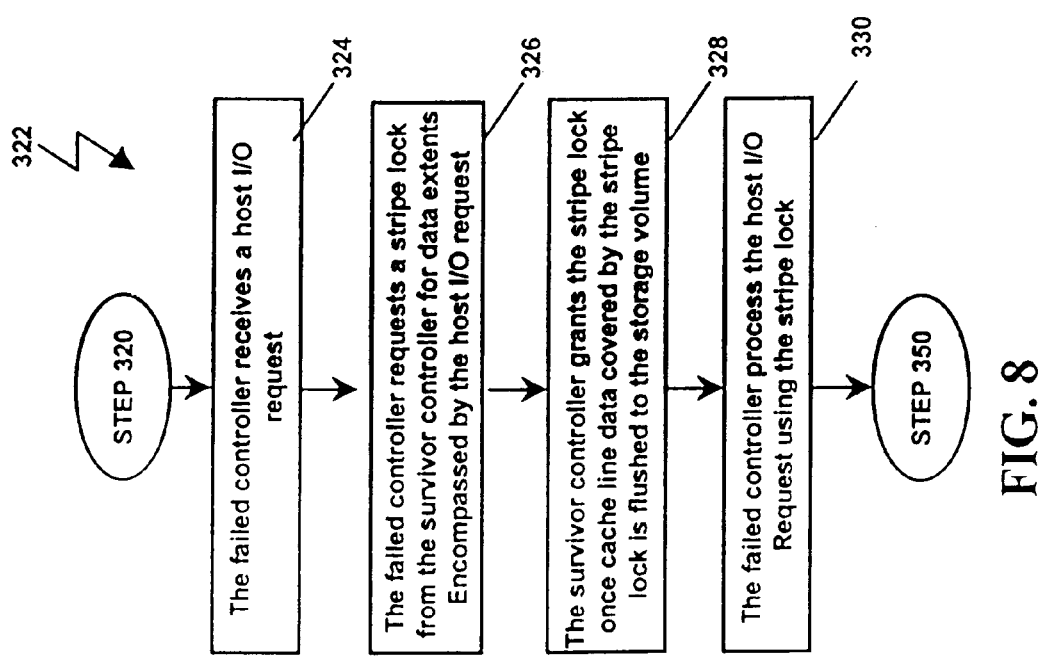
FIG. 8 depicts additional method steps for processing host I/O requests using the stripe lock data structure following a controller failure according to an embodiment of the invention.

FIG. 8 depicts procedural method steps 322 for using the stripe lock data structure (reservation status data structure) to process I/O requests by the failed controller 208, of step 320, for example, in the data storage system 200, as depicted, for example in the embodiment of FIG. 5. At step 324, the failed controller 208 receives a host I/O request by from the host system 202. At step 326, the failed controller 208 requests a stripe lock, from the survivor controller 206, for data extents encompassed by the host I/O request. At step 328, the survivor controller 206 grants the stripe lock once cache line data within the survivor controller 206 cache memory 214, and covered by the stripe lock, is flushed to the one or more storage volumes 212. Finally at step 330, the host I/O request is processed by the failed controller 208. As the survivor controller 206 flush cache line data for each granted stripe lock, the failed controller 208's dirty cache line is eventually flushed to the storage volume 212. As a result, the host system 202 does not receive busy (BUSY) signals or selection time outs in response to host I/O requests while the dirty cache line data is flushed to the storage volume 212.

Figure 9:
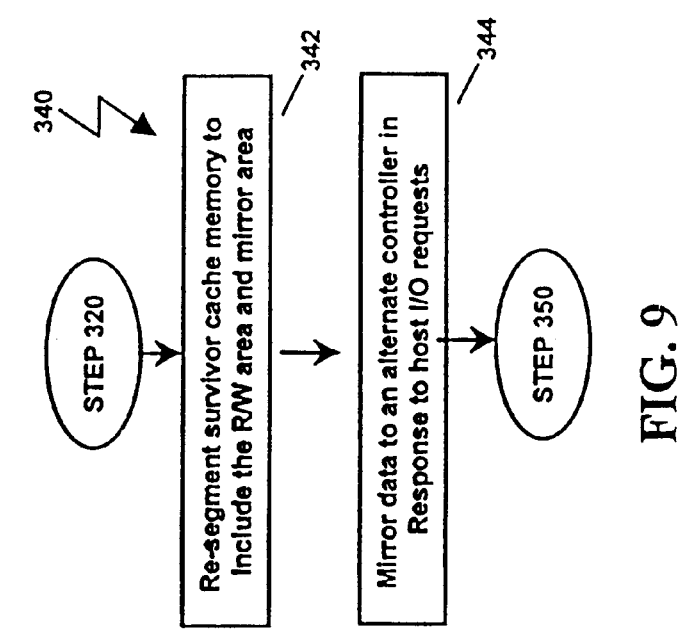
FIG. 9 depicts additional method steps for the efficient failback method according to an embodiment of the invention.

FIG. 9 depicts additional procedural method steps 340 for the efficient failback method 300, for example, in the data storage system 200, as depicted, for example in the embodiment of FIG. 5. At step 342, the survivor controller 206 cache memory 214 is re-segmented to include an R/W area and a mirror area, as originally configured. The configuration will typically change depending upon the status of the controller, such as a failed controller status. After a failover, the mirror area is converted into a continuation of the read/write area. It changes to allow more read/write I/O to be accepted before older data is removed from the cache. This change may include actually or effectively providing or allocating a larger cache size. Having both a read/write (R/W) area and a mirror area allows the survivor controller 206 and the failed controller 208 to manage the data storage system 200 in a dual-active controller configuration. Finally at step 344, a controller mirrors data to an alternate controller in response to host I/O requests. In response to the mirror request, the alternate controller copies the data into an alternate controller cache memory 220. By utilizing cache data mirroring, a copy of dirty cache line data for each controller 206,208 in the data storage system 200 is stored in preparation for a controller failure.

Exemplary embodiments have been described with reference to specific configurations. Those skilled in the art will appreciate that various changes and modifications can be made while remaining within the scope of the claims. It is to be understood that even though numerous characteristics and advantages of various embodiments of the present invention have been set forth in the foregoing description, together with details of the structure and function of various embodiments of the invention, this disclosure is illustrative only, and changes maybe made in detail, especially in matters of structure and arrangement of parts within the principles of the present invention to the full extent indicated by the broad general meaning of the terms in which the appended claims are expressed. For example, the particular elements may vary depending on the particular application for the stripe locks while maintaining substantially the same functionality without departing from the scope and spirit of the present invention. In addition, although the preferred embodiment described herein is directed to a data storage system, it will be appreciated by those skilled in the art that the teachings of the present invention can be applied to other data processing systems utilizing storage devices configured differently than the exemplary 4+1 RAID 5 system drive described herein without departing from the scope and spirit of the present invention.

Having disclosed exemplary embodiments and the best mode, modifications and variations may be made to the disclosed embodiments while remaining within the scope of the invention as defined by the following claims.

What is claimed is:

1. A method for efficient failover/failback in a data storage system, the data storage system managed in a dual-active controller configuration, the method comprising:

defining a stripe lock data structure to maintain reservation status or stripe locks of cache lines within data extents that are part of a logical unit or storage volume;

when a controller fails, taking over dirty cache line data of a failed controller by a survivor controller; and using the stripe lock data structure to process I/O requests from a host system, by the failed controller, until the dirty cache line data is flushed to one or more storage volumes, by the survivor controller.

2. The method of claim 1, wherein the taking over the dirty cache line data step further comprises:

moving the dirty cache line data into a read/write area of a survivor controller cache memory;

re-booting the failed controller; and once the failed controller has re-booted, passing a host ID back to the failed controller, thereby enabling the failed controller to being accepting of I/O requests from the host system.

3. The method of claim 1, wherein the using the stripe lock data structure step further comprises:

receiving a host I/O request, by the failed controller, from the host system;

requesting a stripe lock, by the failed controller, from the survivor controller for data extents encompassed by the host I/O request;

granting the stripe lock, by the survivor controller, once cache line data within the survivor controller cache memory and covered by the stripe lock is flushed to the one or more storage volumes; and processing the host I/O request by the failed controller.

4. The method of claim 1, further including:

re-segmenting the survivor controller cache memory to include a read/write area and a mirror area, thereby allowing the survivor controller and the failed controller to manage the data storage system in a dual active configuration; and mirroring, by a controller, data to an alternate controller in response to host I/O requests, such that the alternate controller copies the data into an alternate controller cache memory, thereby providing a copy of dirty cache line data for each controller in the data storage system in preparation for a controller failure.

5. A computer program product for efficient failover/failback in a data storage system, the data storage system managed in dual active controller configuration, the computer program product including a computer readable medium and a computer mechanism stored thereon, the computer mechanism comprising:

defining a stripe lock data structure to maintain reservation status or stripe locks of cache lines within data extents that are part of a logical unit or storage volume;

when a controller fails, taking over dirty cache line data of a failed controller by a survivor controller; and using the stripe lock data structure to process I/O requests from a host system, by the failed controller, until the dirty cache line data is flushed to one or more storage volumes, by the survivor controller.

6. The computer program product of claim 5, wherein the instruction for the taking over the dirty cache line data further comprises instructions for:

moving the dirty cache line data into a read/write area of a survivor controller cache memory;

re-booting the failed controller; and once the failed controller has re-booted, passing a host ID back to the failed controller, thereby enabling the failed controller to being accepting of I/O requests from the host system.

7. The computer program product of claim 5, wherein the instruction for the using the stripe lock data structure further comprises instructions for:

receiving a host I/O request, by the failed controller, from the host system;

requesting a stripe lock, by the failed controller, from the survivor controller for data extents encompassed by the host I/O request;

granting the stripe lock, by the survivor controller, once cache line data within the survivor controller cache memory and covered by the stripe lock is flushed to the one or more storage volumes; and processing the host I/O request by the failed controller.

8. The computer program product of claim 5, further comprising instructions for:

re-segmenting the survivor controller cache memory to include a read/write area and a mirror area, thereby allowing the survivor controller and the failed controller to manage the data storage system in a dual active configuration; and mirroring, by a controller, data to an alternate controller in response to host I/O requests, such that the alternate controller copies the data into an alternate controller cache memory, thereby providing a copy of dirty cache line data for each controller in the data storage system in preparation for a controller failure.

9. In a computing environment that allows data access through two or more caching controllers, a storage volume reservation system comprising:

a stripe lock data structure defined in memory within each of said two or more caching controllers;

said stripe lock data structure providing consistent information within each of the two or more caching controllers; and said stripe lock data structure being used by a failed controller to process I/O requests from a host system until dirty cache line data is flushed to one or more storage volumes by a survivor controller.

10. A caching storage controller device, comprising:

a memory defining a stripe lock data structure and storing stripe locks of cache lines within data extents that are part of a logical unit or storage volume shared by a plurality of caching storage controller devices;

the caching storage controller device configured to use the stripe lock data structure to process I/O requests from a host system until dirty cache line data is flushed to one or more storage volumes by a survivor controller following a controller failure.

11. The apparatus of claim 10, wherein the caching storage controller device controls a plurality of storage devices configured as a redundant array of independent disks (RAID).

12. A method for using a caching storage controller device, the method comprising:

defining a stripe lock data structure in a memory of the caching storage controller to maintain reservation status or stripe locks of cache lines within data extents that are part of a logical unit or storage volume shared by a plurality of caching storage controller devices;

when a controller fails, taking over dirty cache line data of a failed controller by a survivor controller; and using the stripe lock data structure to process I/O requests from a host system, by the failed controller, until the dirty cache line data is flushed to one or more storage volumes, by the survivor controller.

13. In a computer system having a host computer and a data storage system having storage units coupled to the host through first and second multi-active data storage system controllers, a method for redirecting input/output requests from an intended first controller to a survivor second controller when said intended first controller is unavailable, the method comprising:

defining a data structure to store and maintain status of cache lines within data extents that are part of a storage unit;

when said intended first controller fails, taking over dirty cache line data of said failed intended first controller by said survivor second controller; and processing input/output requests from said host system by said failed first controller using said stripe lock data structure to process input/output requests from said host system, by the failed controller, until the dirty cache line data is flushed to one or more storage volumes, by the survivor controller.

14. The method in claim 13, wherein said storage unit comprises a logical unit.

15. The method in claim 13, wherein said storage unit comprises a storage volume.

* * * * *